July 16, 1940.  C. M. HOLMEN  2,207,884
DRAW-OFF GATE CONTROL FOR ICE CREAM FREEZERS
Filed Nov. 30, 1938
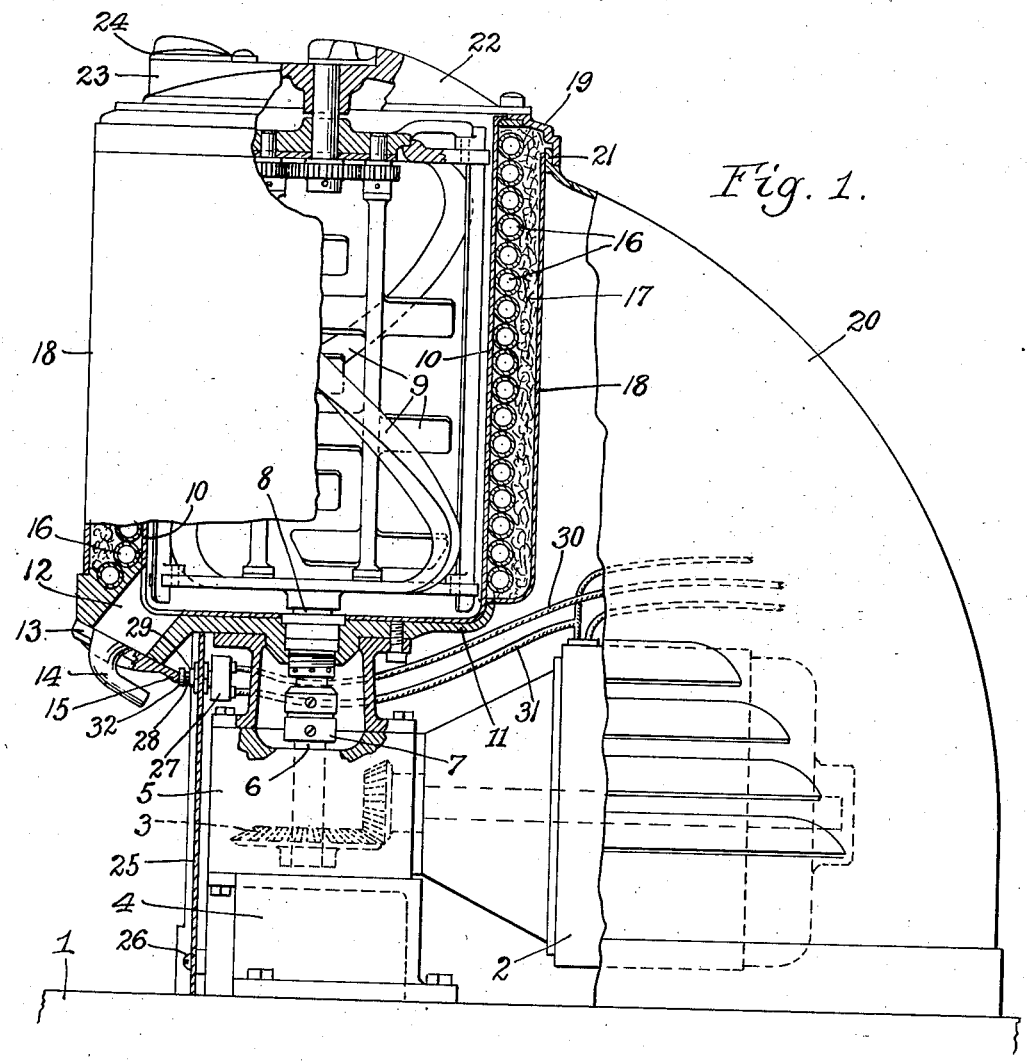
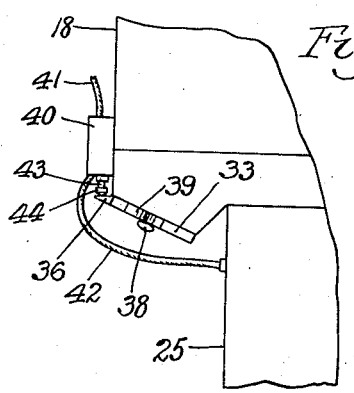
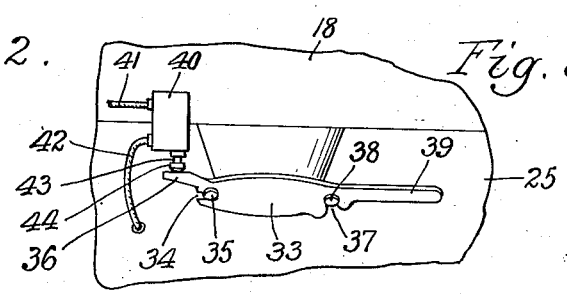
Inventor
Carl M. Holmen.
by Parker + Carter
Attorneys.

Patented July 16, 1940

2,207,884

UNITED STATES PATENT OFFICE 2,207,884

DRAW-OFF GATE CONTROL FOR ICE CREAM FREEZERS

Carl M. Holmen, Grand Haven, Mich., assignor to The Bastian-Blessing Company, Chicago, Ill., a corporation of Illinois Application November 30, 1938, Serial No. 243,074

1 Claim. (Cl. 259—1)

This invention relates to a freezer and to means associated with the controlling of a freezer. When I use the word "freezer" I mean a device suitable for freezing ice cream or for cooling, whipping or beating fluids. One object of the invention is to provide an automatic means associated with a freezer in which there is a housing and a beater arranged to move within the housing, and a discharge from the housing and in which automatic means are provided for causing the beater to operate during discharge of material from the casing and for stopping the rotation after discharge is complete. One object of the invention is, therefore, to associate with a discharge gate an automatic connection for stopping and starting the beater automatically in response to the closing and opening of the gate. Another object is to associate with a housing having an opening and a gate for closing the opening an electrical switch which would automatically be operated in response to movements of the gate.

Other objects will appear from time to time throughout the specification and the claim.

The invention is illustrated more or less diagrammatically in the accompanying drawing, wherein:

Figure 1 is a vertical section with parts in elevation and parts broken away, illustrating one form of the device as applied to a freezer;

Figure 2 is a fragmentary side view of another form of the device;

Figure 3 is a front view of the form of the device shown in Figure 2.

Like parts are designated by like characters throughout the specification and the drawing.

The device will generally be supported on a counter, a table or other suitable base 1. It includes preferably a motor assembly 2, which includes a reduction gearing 3. The motor and reducer assembly are carried upon a base 4, which is secured to the counter 1 as desired. The gearing 3 is enclosed within the housing 5, which is itself supported upon the base 4. Extending upwardly from the shaft 6, which is enclosed within the housing 5, is a coupling 7 secured to a shaft 8 upon which the beater assembly 9 is mounted. The details of the beater assembly form no essential part of the present invention and need not be described in full. For the purposes of the present invention, it is sufficient that a movable beater is provided and that means for moving or rotating it are also provided. Suitable gearing and other parts may be of almost any desired construction.

An inner-shell 10 is provided to furnish the freezing compartment and it surrounds the beater 9. A reinforcing base 11 may be provided and through this reinforcing base is an opening 12 for the discharge of the contents when desired. This is closed by a gate 13, which may have a handle 14 and a projection 15.

Positioned about the inner-shell 10 is a cooling coil system 16 through which cooling fluid is circulated from any desirable source. If desired, insulating material as at 17 may be positioned about the freezer and the coil, and may be surrounded by a jacket or outer cover 18. An upper ring 19 surrounds and holds the jacket 18 in place.

If desired, the motor and reducer housing may be enclosed by a hood-like member 20, which may or may not, as desired, enclose a part or all of the freezer. When the hood member 20 is used, it is engaged as at 21 by the ring 19.

A cover 22 is removably positioned upon the freezer to close its top. A filler hole may be formed in the member 23 and may be provided with a movable cover member 24.

25 is a housing front plate, and it may be removably secured in place by one or more screws 26. Supported upon the housing plate is a switch 27 having a suitable mechanism which includes a push rod 28 and a bushing or support 29 therefor. Suitable wires or conduits 30 and 31 are connected to the switch and to the motor 2. The details of the wiring are unimportant and the mechanism may be controlled entirely by the switch 27 or may also be controlled by one or more other switches. At its outer or free end the push rod 28 may carry a contact button 32, which when the parts are in the position shown in Figure 1 is contacted by the projection 15 of the door 13. The switch is provided with a spring or other means which tends normally, when free to do so, to force the push rod outwardly and thus to actuate the switch to energize the motor circuit. When the door is in closed position, the switch is actuated to break that circuit.

A modified form of the switch operating means is shown in Figures 2 and 3. As there shown, the draw-off door and gate are slightly modified. A draw-off opening similar to that shown in Figure 1 is formed and is closed by a gate 33. This gate is notched as at 34 and may engage a fixed pin 35. It is provided with a switch-operating extension 36. At its opposite end the gate is notched as at 37 to engage a pin 38 and may have a handle 39, if desired. As shown in Figures 2 and 3, the gate is in the closed position.

40 indicates a switch from which wires 41 and 42 lead and from which a push rod 43 projects. This rod may carry a button 44 for contact with the gate extension or projection 36.

Although I have shown an operative form of my device, it will be understood that many changes in the form, shape and arrangement of parts might be made without departing from the spirit of my invention, and I wish that my showing be taken as in a sense diagrammatic. In particular, the switch mechanism and the freezer mechanism and the structural details of the freezer and its casing might be greatly varied so long as means are provided for controlling the operation of the freezer motor in response to the movement and position of the draw-off gate The use and operation of this invention are as follows:

Ordinarily the gate will be opened only to empty the contents after it has been prepared for use or to permit washing. For both of these purposes it is desirable to have the beater operate when the gate is open. In fact, ordinarily it is essential to have the beaters operate when the contents are being discharged for use because the ice cream or the partially frozen drink will, as a rule, not flow except when the beaters are moving.

It is vitally important that the beaters are not caused to operate too much or too long. After the ice cream or the beverage has been prepared by the proper amount of beating, further beating destroys its quality and forces out of it all or part of the "over-run" which has been previously put into the contents of the freezer. When this is discharged, the volume of the material is reduced or the quality is destroyed, or both. Consequently, it is important to prevent unnecessary operation of the beaters.

The freezer may or may not be associated with an automatic control arranged to cause the beaters to operate automatically. Whatever the control of the beaters, they will be stopped after the contents of the freezer has been satisfactorily beaten or stirred. Ordinarily when material is to be discharged for use the beaters will not be in operation. A manual switch could be used so that when the gate is to be opened the switch is manually turned on. Experience has shown, however, that when this is done, the operator will frequently fail to turn off the switch and stop the beaters when the gate is closed, with the result that when service is desired again the beaters have been left running and the contents has been injured so that it is no longer usable.

The structure of the present invention, in the first place, makes certain automatically that the beaters will be turned on when the gate is opened for the discharge of the material. It also makes certain that the beaters will be stopped when the gate is closed. One possible exception to the latter situation rises when whatever other control is provided for the beaters has been manipulated to cause them to rotate. Sometimes service is made when the beaters are still going in response to the operation of another control. If that occurs, the opening of the gate will not cause any change in the operation of the beaters. They will continue to operate as long as the other control is set to accomplish that result. But where the beaters are stationary and the gate is opened, the member 15 or 36 moves out of contact with the switch button as the gate is opened, and when this occurs, the spring within the switch is effective to operate the switch to complete the circuit and to start the beaters.

When the gate having been opened is closed the projection on the gate contacts the push button of the switch and moves the switch to the open position, thus breaking the circuit and stopping the operation of the beaters unless, as above noted, the beaters are being driven irrespective of the position of the gate.

Where freezers are used to dispense frosted drinks, it has been the custom in the past to start the beaters by manual control, the switch being turned to the "beaters only" position. If a careless operator were to leave the switch in this position, the contents of the freezer would be increased in temperature, losing over-run or air volume with attendant loss of profit, and the product might be served at an undesirable consistency.

By means of the present invention with the switch in the automatic position, the operator is not required to move the switch manually to start the beaters for discharging the contents of the freezer. The mere opening of the draw-off gate performs this function, and the operator need not remember to turn the switch to position where temperature control of the freezer contents will be maintained at the proper level. The structure of the invention will accomplish this result automatically.

I claim:

In combination, a freezer housing, a discharge passage member adjacent the bottom thereof, beating means located within the freezer housing, a motor therefor, a circuit for said motor, a control switch in said circuit, means tending normally to urge said control switch to circuit closing position, a gate for said discharge passage member, said gate being adapted, when in closed position, to move said control switch to motor circuit breaking position, and when in open position to permit movement of said switch to circuit closing postion.

CARL M. HOLMEN.